Nov. 26, 1929.  S. BROWN  1,737,214
PIPE FASTENING
Filed Aug. 7, 1929   2 Sheets-Sheet 1
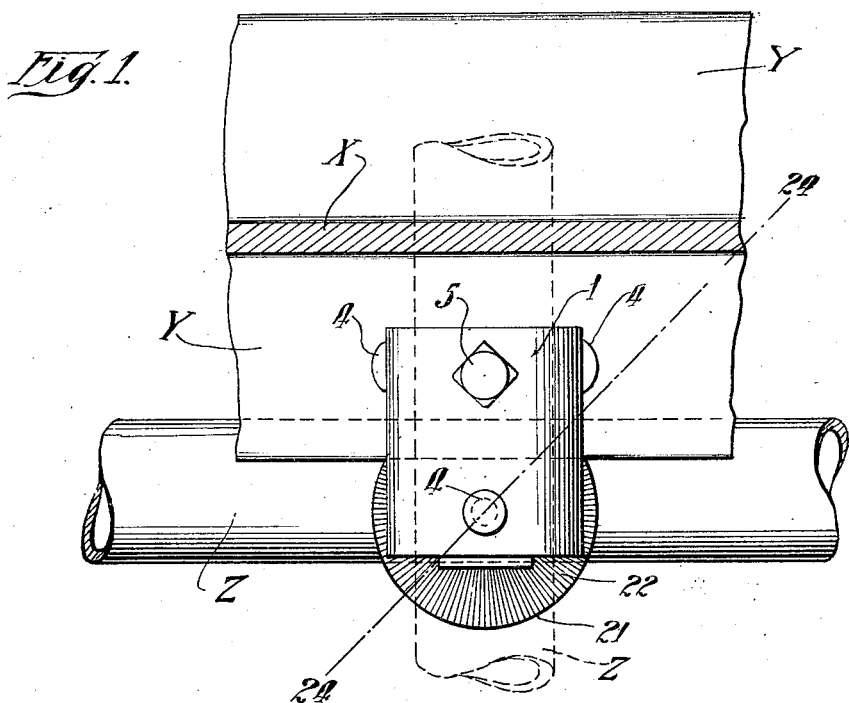
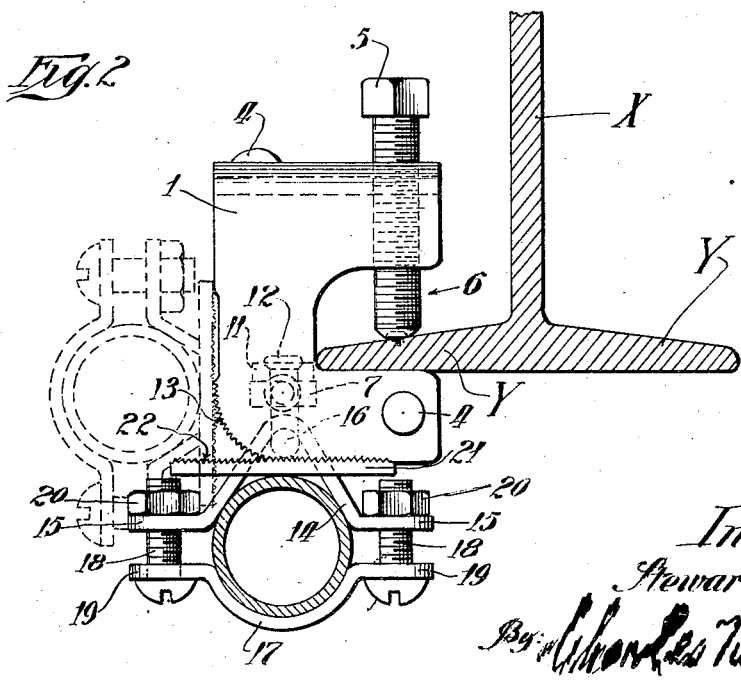
Inventor:
Stewart Brown Nov. 26, 1929.　　　　S. BROWN　　　　1,737,214
PIPE FASTENING
Filed Aug. 7, 1929　　　2 Sheets-Sheet 2
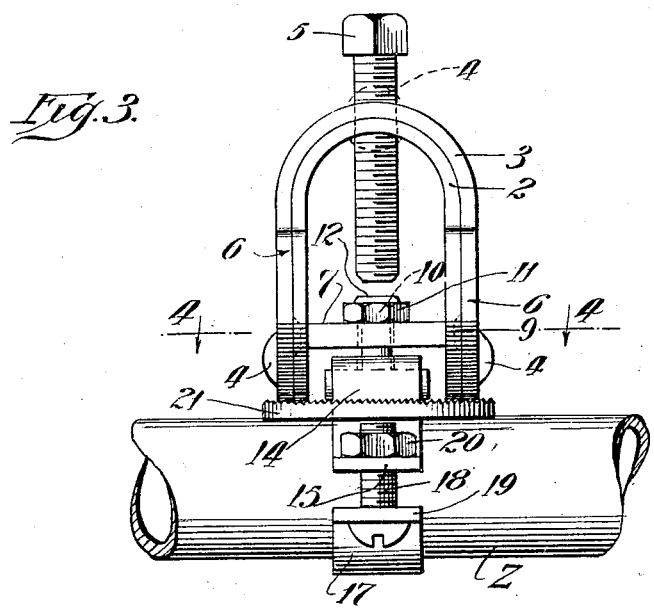
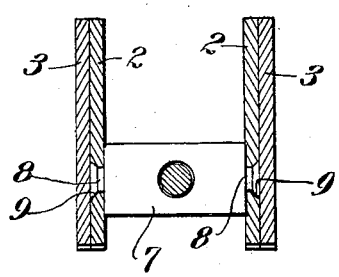
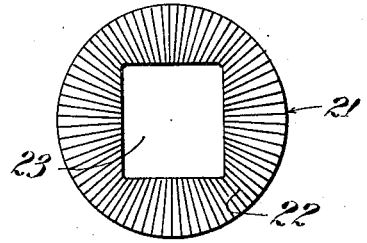
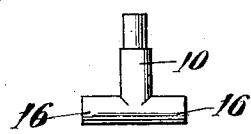
Inventor:
Stewart Brown Patented Nov. 26, 1929

1,737,214

UNITED STATES PATENT OFFICE

STEWART BROWN, OF CHICAGO, ILLINOIS

PIPE FASTENING

Application filed August 7, 1929. Serial No. 384,223.

This invention relates to means to fasten pipes to the flanges of iron beams, usually I-beams, used in the construction of buildings.

Among the objects of this invention is to obtain a pipe fastening which can be secured to a flange of an iron beam or girder, and by means of which a pipe can be secured in place in any desired relation to said beam or girder. A further object is to obtain a pipe fastening which is easily mounted on a flange of an iron beam or girder, and readily adjusted so that the pipe which is to be secured in place thereby may be at any required angle relative to said beam or girder; and said pipe may then be placed in said fastening and rigidly secured in said required relation. A further object is to obtain a pipe fastening which is of simple construction, of light weight relative to the load it is to carry, which is not liable to become broken or to get out of order, and a pipe fastening the adjustments whereof may be easily understood and readily made by any person skilled in the art of attaching pipes to the flanges of iron beams or girders.

In the drawings referred to Fig. 1 is a horizontal section of a portion of an I-beam or girder, showing the lower flanges thereof in top plan view, with a top plan view of a construction embodying the invention mounted on one of said flanges, and with a short section of pipe secured in said construction, so as to be in a lower plane and parallel to said flange. Fig. 2 is a vertical section of the portion of the I-beam which is illustrated in Fig. 1, at right angles to the view in said Fig. 1, with a side elevation of the construction embodying the invention, attached to a flange of said I-beam, as in Fig. 1, and in the same relation thereto, with the section of pipe in Fig. 1 also shown in said fastening, in vertical section, with broken lines indicating said pipe and a portion of said fastening in a plane at right angles to their position as illustrated by full lines in said figure, said pipe being parallel, as indicated by said broken lines, to the edges of said flanges and nearly in the same plane. Fig. 3 is a front elevation of a construction embodying the invention removed from the flange of the beam or girder which is illustrated in Figs. 1 and 2, with a side elevation of a portion of a pipe secured therein, in the position thereof which is illustrated in Fig. 1. Fig. 4 is a vertical section of the pipe fastening which is illustrated in Fig. 3, taken on line 4—4 of Fig. 3, viewed as indicated by arrows. Fig. 5 is a top plan view of a member forming an element of the fastening which is illustrated in Figs. 1, 2 and 3, removed from its associated parts; and Fig. 6 is a side elevation of an additional member forming an element of the construction which is illustrated in Figs. 1, 2 and 3, removed from its associated parts.

A reference numeral applied to designate a given part indicates said part throughout the several figures of the drawing wherever the same appears.

X represents the vertical body member of an I-beam or girder, and Y the lower horizontal flanges thereof. 1 represents the base of the construction embodying this invention. Base 1 preferably consists of a plurality of U-shaped members, 2, 3, (see Fig. 3) secured together as by rivets 4. The making of base 1 in a plurality of parts is principally to enable me to bend the the metal bars of which said members are formed into the U-shape desired, with lighter machinery than if said base is in one bar; and also, to obtain greater rigidity in said base as against the means, to wit, set screw 5, employed to secure said base to the flange of a beam or girder. 6 represents a recess on one side of base 1, in which recess one of the flanges Y to which the construction is attached, may extend, as is well illustrated in Fig. 2. To mount base 1 on said flange Y, said base is placed on said flange and set screw 5 is turned down thereonto, (see Fig. 2). 7 represents a cross bar which is illustrated as pivotally mounted at its ends 8, in member 2 of the base; this cross bar 7 is preferably made of ductile metal, as wrought iron, and the holes in said member 2 in which the ends of said cross bar are pivoted, is preferably counter sunk, as at 9, and said ends are riveted or swaged in said counter-sunk portions of said holes, to give additional strength to said cross bar against the strain of the T-shaped member 10, which is put thereon when the device is secured in an adjusted position, with a pipe in the fastening, as hereinafter described. Said riveting of said ends 8 of member 7 in said countersunk edge of said aperture is not essential, when said bar is made of sufficiently heavy material, to withstand the strain placed thereon.

By the making of base 1 in a plurality of parts, as parts 2 and 3, the part 3 is not perforated for the pivoted ends of bar 7, and greater strength is thereby retained in said part 3 against the strain caused by the set screw 5. The T-shaped member 10 is preferably mounted in bar 7 in the manner illustrated, by placing member 11 thereon and riveting the upper end of said T-shaped member over on to said member 11, as at 12, (see Figs. 2 and 3). This construction is well adapted to enable said member 3 to withstand the strain thereon which occurs when the construction is secured with a pipe thereon, in an adjusted position as is hereinafter set forth. The corner 13, (see Fig. 2), of base 1, is rounded and roughened, or serrated, for reasons hereinafter recited. 14 represents a member which is pivotally mounted on element 16 of member, 10, an aperture being made at the junction of the sides forming the V of said member 14 through which said member 10 extends, so that said member 14 may be said to be mounted on element 16 of said member 10. 15 represents flange elements or ends of member 14, which are provided with holes or apertures to permit the extending of bolts 18 therethrough. Member 17 is provided with a curved portion and with ends or flanges 19; said ends also having holes or apertures through which said bolts 18 extend. 20 represent nuts on bolts 18. 21 represents a circular member which is provided with aperture or hole 23, (see Fig. 5) through which member 14 extends when the several parts of the construction are assembled; and with a roughened or serrated face 22 on the side thereof which comes in contact with the roughened or serrated corner 13 of the base, when member 14 is rigidly secured in place, as hereinafter recited. This member 14 may be turned from the position in which it is illustrated by full lines in Fig. 2, it being pivoted on part 16 of member 10, into the position indicated by broken lines in said figure; or into any angular position therebetween, and at all times said roughened or serrated faces of member 14 and corner 13 will be in position to be forced into close contact to hold them in adjusted position. Said roughened or serrated surfaces being for the purpose of holding said members in a determined angular position relative to the base 1; with a pipe Z inserted between members 14 and 17 and the bolts 18 are tightened, as is illustrated in Figs. 2 and 3. Bolts 18 being turned tightly into nuts 20 pipe Z is forced against member 21, and the roughened or serrated surfaces of member 21 and corner 13 are thereby held rigidly in an adjusted position.

By examination of Figs. 2 and 3 it will be observed that members 10, 14 and 17 may be turned from the position which is illustrated in said figures into a position in a horizontal plane at right angles to that in which they are illustrated in said figures; said member 10 turning pivotally in bar 7. Said members 10, 14, 17 and pipe Z may be pivotally turned in bar 7 into any desired horizontal plane and into any desired angular position in said plane from that in which said members are illustrated in said figures.

By mounting the bar 7 pivotally, as described, in base 1, mounting member 10 pivotally in bar 7 and mounting member 14 pivotally on elements 16 of member 10, I obtain a universal joint all the members of which are adjustable until pipe Z is in position between members 14 and 17 and bolts 18 are tightened in nuts 20; and that thereafter said adjusted parts are rigidly held in place, by said tightening of said bolts 18 in nuts 20.

It is to be observed that member 14 between ends or flanges 15 is V-shaped, and that member 17, between ends or flanges 19 corresponds roughly to the periphery of pipe $Zm$ so that the tightening of said bolts 18 in nuts 20 forces pipe Z against member 21 and thereby forces said member against base 1, in the manner and for the purpose hereinbefore described.

The broken line 24, Fig. 1, represents the axial line of pipe Z, in a position in which said pipe may be turned from the position which is indicated by broken lines in Fig. 2; the member 10 in such case turning pivotally in bar 7.

To turn the members 14, 17 and pipe Z from the position illustrated by full lines in Fig. 2 to the position indicated by broken lines, bar 7 is pivotally turned in base 1.

I claim;

1. In a pipe fastening, a base consisting of a U-shaped member provided with recesses on one side of the parallel elements thereof, and a set screw in said base, in combination with a bar the ends whereof are pivotally mounted in said parallel elements, a T-shaped member pivotally mounted in said bar, a member mounted on said T-shaped member, a disk provided with an aperture, said last named member extending through said aperture, and an additional member, the member which is mounted on said T-shaped member and said additional member adapted to have a pipe placed between them, and means to force said pipe against said disk and to draw the member which is mounted on said T- shaped member rigidly into an adjusted position.

2. In a pipe fastening, a base consisting of a U-shaped member provided with recesses on one side of the parallel elements thereof, a rounded corner on the opposite side of said parallel elements, and a set screw through the connecting bar of said parallel elements, in combination with a bar pivotally mounted in said parallel elements, a T-shaped member pivotally mounted in said bar, a member mounted on said T-shaped member, a disk provided with an aperture, said last named member extending through said aperture, the meeting face of said disk and said rounded corner serrated, and an additional member, the member which is mounted on said T-shaped member and said additional member adapted to have a pipe placed between them, and bolts extending through said last named members to hold said pipe rigidly in place and to force said disk against said base.

3. In a pipe fastening, a base consisting of a U-shaped member provided with recesses on one side of the parallel elements thereof, a set screw in said base, and a bar pivotally mounted at its ends in said parallel elements, in combination with a T-shaped member pivotally mounted in said bar, a member mounted loosely on said T-shaped member, a disk provided with an aperture mounted on said last named member, and an additional member, said additional member and the member mounted on said T-shaped member adapted to have a pipe placed between them, and means to force said additional member against said pipe, to force said pipe against said disk and to force said disk against said base, to hold all said members rigidly in place relative to said base.

4. In a pipe fastening, a base, means to attach said base to an iron beam, a bar pivotally mounted at its ends in said base, a T-shaped member rotatably mounted in said bar, in combination with a member provided with an aperture therethrough, a V-shaped member extending through said aperture and loosely mounted on the cross bar of said T-shaped member, said apertured member adapted to come in contact with said base, and with the meeting faces of said apertured member and of said base serrated, an additional member provided with a curved portion between its ends, and bolts engageable with the ends of said additional member and also engageable with the ends of said V-shaped member, all arranged so that when a pipe is inserted between said V-shaped member and said additional member and said bolts are tightened, said pipe, and all said members which are mounted on said base are rigidly held in a determined position relative thereto.

STEWART BROWN.